United States Patent [19]

Yoshida et al.

[11] 4,026,728

[45] May 31, 1977

[54] STEEL SHEETS AND STRIPS HAVING A SURFACE LAYER OF M-SI-R

[75] Inventors: Katsuyoshi Yoshida, Tokai; Zyun-Ichi Morita, Aichi; Kenzi Koyama, Tokai, all of Japan

[73] Assignee: Nippon Steel Corporation, Tokyo, Japan

[22] Filed: Sept. 29, 1975

[21] Appl. No.: 617,652

[30] Foreign Application Priority Data

Oct. 1, 1974 Japan .............................. 49-113063

[52] U.S. Cl. .................... 148/6.14 R; 148/6.15 R; 148/6.16; 427/387
[51] Int. Cl.² ......................................... C23F 7/00
[58] Field of Search ................ 148/6.15 R, 6.15 Z, 148/6.16, 6.14 R; 427/387

[56] References Cited

UNITED STATES PATENTS

| | | | |
|---|---|---|---|
| 2,709,569 | 5/1955 | Roush | 148/6.14 R |
| 3,061,467 | 10/1962 | Vincent | 427/387 |
| 3,085,908 | 4/1963 | Morehouse et al. | 427/387 X |
| 3,088,847 | 5/1963 | Pines | 427/387 X |
| 3,166,527 | 1/1965 | Ender | 427/387 X |

*Primary Examiner*—Ralph S. Kendall
*Assistant Examiner*—Charles R. Wolfe, Jr.
*Attorney, Agent, or Firm*—Toren, McGeady and Stanger

[57] ABSTRACT

A surface treated steel sheet and strip having a surface layer of M-Si-R in which M is at least one of the group consisting of chromium, phosphorus, silicon, cobalt, manganese, copper, nickel, aluminum and titanium, and R is a group of atoms which has 2 to 10 carbon atoms and contains one or more functional groups selected from the group consisting of vinyl, epoxy, acryl and amino groups.

7 Claims, No Drawings

STEEL SHEETS AND STRIPS HAVING A SURFACE LAYER OF M-SI-R

BACKGROUND OF THE INVENTION

The present invention relates to a steel sheet and strip (hereinafter called as sheet) having good paint adhesion and the process for producing it.

Conventionally, the phosphate treatment has been often used for the purpose to improve the paintability of a steel sheet itself.

Further, plated steel sheets, including tin-, zinc- and aluminum-plated and TFS-CT, have been recognized advantageous for protecting the base metal material in various applications. More particularly, the role of the plating layer is twofold; one is to protect the base metal from corrosion, and the other is to give paintability to the material when it is used as painted. Of course the painted layer on the plated metal contributes to protect the base metal.

However, such chemical treatment as mentioned above to produce plated steel sheets requires complicated processes of the treatment and highly skillful technics as well as proper disposal of exhaust liquid and the equipments for the treatments. Hence, increased production cost is encountered with. Further, the products thus prepared are not always sufficiently paintable.

The present invention has its object to provide a steel sheet having more excellent paintability than that of the conventional phosphate treated steel sheets and that of the conventional plated steel sheets.

More particularly, the present invention has made it possible to provide at much less cost those steel sheets having the paintability well comparable with or superior to that of the conventional products. For example, a simple supplementary treatment according to this invention which is additionally applied to a conventional plate steel sheet can produce remarkable improvement in paintability, and thus raise the commercial value of the same.

SUMMARY OF THE INVENTION

The steel sheet according to the present invention is obtained by subjecting the base steel sheet to the first step of process where a corrosion resistant base film is formed on the surface of the steel sheet by an electrolysis or dipping treatment carried out in a solution containing one or more members selected from the group consisting of chromic acid, phosphoric acid, salts of chromium, molybdenum, silicon, cobalt, manganese, copper, nickel, aluminum and titanium and then subjecting the steel sheet to the second step of process where the steel sheet is treated in a solution containing one or more members of the organic silicon compound which are expressed by the general formula $RSiX_3$, where R is a group of atoms having 2 to 10 carbon atoms and contains one or more functional groups selected from the group consisting of vinyl, epoxy, acryl and amino groups, and X is a halogen atom or an alkoxyl group.

DESCRIPTION OF THE PREFERRED EMBODIMENTS

The present invention will be described in detail. The solution used in the first step of the process is an aqueous solution which contains one or more members selected from the group consisting of chromic acid, phosphoric acid, salts of chromium, molybdenum, silicon, cobalt, manganese, copper, nickel, aluminum and titanium.

The process may be carried out in any of the known usual electrolysis, dipping and spraying methods. A corrosion resistant base film is thus formed, where the thickness of the film should be maintained uniform by adjusting the time of electrolysis, or the roll squeezing pressure, and the film should be hardened, if necessary, by a thermal treatment.

The first step of the process is intended to give corrosion resistance to the base metal and to make the metal surface as appropriate as to be subjected to the treatment in the second step of the process. Any solution and process for the treatment, if they are suited to the object mentioned above, may be employed in this invention to produce the desired results.

For example, the arts disclosed in the following patents may be employed in the first step of the process of this invention. They include Japanese Patent Publication Nos. Sho 34-8807, 35-8917, 39-18312, 40-1093 and 40-12060 disclosing chromate treatment of iron and steel surfaces; Japanese Patent Publication Nos. Sho 39-2776, 40-5290, 44-29363 and 45-5129 disclosing treatment methods of aluminum plated surfaces; Japanese Patent Publication Nos. Sho 40-4527, 42-6643, 42-14050 and 44-29368 disclosing treatments for zinc-plated surfaces; and Japanese Patent Publication No. Sho 38-6874 and U.S. Pat. No. 3,491,001 for treatments of tin-plated surfaces.

The steel sheet treated in the first step according to the present invention is transferred either immediately, for example in a continuous line treatment, or before deterioration of the corrosion resistance, for example, in a separate treatment line, to the second step of the process.

In the second step of the process according to the present invention, the steel sheet on which a corrosion resistant base film has been formed in the first step is then treated with an organic silicon compound or compounds expressed by the general formula $RSiX_3$, for the purpose of improving adhesion between the base film and the paint layer to be applied thereon. The organic silicon compounds effective for the purpose with favorable results are expressed by the general formula $RSiX_3$, where R is an atom group having 2 to 10 carbon atoms and containing one or more functional groups selected from the group consisting of vinyl, epoxy, acryl and amino groups, and X is either a halogen atom or an alkoxyl group.

The organic silicon compounds mentioned above include

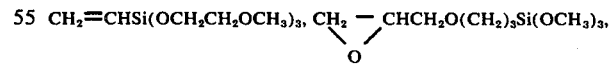

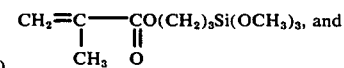

Commercial products thereof are for example KBC 1003, KBM 403, KBM 503 and KBM 603 (trade names) supplied by Shinetsu Chemical Industry.

These organic silicon compounds may be applied in the amount ranging from 5 to 50 mg/m² (as Si) to produce full effects.

As is shown below in Examples, it is apparent that the steel sheets, including plated steel sheets, to which the treatment of this invention has been applied exhibit much better paintability in comparison with those steel sheets which are not treated by the process of this invention.

This effect has been caused by the action of the organic silicon compound $RSiX_3$ as binder of the chromium oxide, phosphate metal salt or a composite base film to the upper organic resinous coating, because X in the organic silicon compound has a strong affinity to inorganic substances while R shows affinity to organic matters.

More particularly, the corrosion resistant base film formed in the first step of the process contains on the uppermost layer thereof reactive groups of atoms such as M — OH, where M is a metal atom selected from the group consisting of Cr, P, Si, Co, Mn, Cu, Ni, Al and Ti, which are in some way oriented. This group of atoms reacts with one or more of the organic silicon compounds expressed by the general formula $RSiX_3$ on the upper most surface of the formed film, when a molecular segregation reaction occurs to separate groups of —HX so that a layer of the form: (Steel Sheet) — (Cr, P, Si, Co, Mn, Cu, Ni, Al, Ti) — Si — R is formed on the surface of the steel sheet after the organic silicon compounds have been applied. The excellent paintability realized on the steel sheets of this invention may reasonably be attributed to the presence of R which is highly reactive with and has strong affinity to organic matters, that is resinous materials in the paint in the case of this invention.

In other words, the treatment in the first step which is effected by use of a chromic or phosphoric acid, or a metal salt serves to each the surface of the steel sheet to an appropriate extent and produce a film which is corrosion resistant and well adhesive to the steel though not sufficiently adhesive to a paint coating. As a result thereof, inorganic reactive functional groups such as M — OH are oriented on the surface of the steel sheet, which then in the second step of process react with X in a reactant $RSiX_3$, consequently forming a combination, M — Si — R, on the surface.

In short, good binding power is achieved between the steel sheet and $RSiX_3$ and between the film produced in the first step and the paint coating produced in the second step of process. Each of the two steps of process is essential to exhibit the desired results of the present invention, as demonstrated in the examples below.

Thus, the final product steel sheets produced by the present invention are endowed with excellent paintability. The same process may be applied as well as to a polished thin sheet, to various base metal materials including plated steel sheets such as steel sheets plated with zinc, tin and chromium with full advantages. In addition, the uppermost layer is not restricted to a paint coating, but may be an adhesive agent or laminated organic resin layers of plastic films, for example.

Examples of the present invention will be shown below.

EXAMPLE 1

A cold rolled and electrolytically degreased low carbon steel sheet (0.3 mm thick) was immersed for 3 sec. at 50° C in a solution containing 330 g/l $CrO_3$, 280 g/l $SiO_2$ and 10 g/l $Ni(NO_3)_2$, and after being roll-squeezed the sheet was box-annealed in a tight coil shape for 3 hrs. in a mixed gas at 650° C consisting of 4 to 6% $H_2$ and 94 to 96% $N_2$ (designated hereinafter as HNX gas). Then the sheet was immersed for 2 sec. in a 30° C aqueous 1% solution of KBM 403 (trade name) from Shinetsu Chemical Industry, roll-squeezed and dried with 100° C hot air for 30 sec. The film obtained in the first step amounted to 58 mg/m² (as metallic chromium) and that in the second step to 15 mg/m² (as Si). This product proved excellent in the evaluation test as will be mentioned later.

EXAMPLE 2

The same material as in Example 1 was immersed for 3 sec. in a 60° C solution containing 200g/l $CrO_3$, 160 g/l $SiO_2$ and 20 g/l $Ni(NO_3)_2$ of which the excess was squeezed away with an air knife, annealed continuously for 30 sec. in the HNX at 700° C, to which a 2% aqueous solution of KBM 503 (trade name) from Shinetsu Chemical Industry was sprayed at the outlet of the furnace, and after being roll-squeezed it was dried with 100° C hot air for 5 sec. The film obtained in the first step amounted to 35 mg/m² (as metallic chromium) and that in the second step to 17 mg/m² (as Si). The product obtained proved excellent in the evaluation test as seen in a later section.

EXAMPLE 3

A cold rolled and electrolytically cleaned low carbon steel sheet (0.17 mm thick) were immersed for 3 sec. in a 50° C solution containing 50 g/l $CrO_3$, 100 g/l aluminum sol and 30 g/l $Cu(NO_3)_2$, roll-squeezed and then thermally treated for 30 sec. in HNX at 500° C. This was then immersed for 2 sec. in a 1% aqueous solution of KBC 1003 (trade name) from Shinetsu Chemical Industry at 30° C, roll-squeezed and dried by blowing it with 100° C hot air for 5 sec. The product was subjected to adjustment rolling with the draft of 2.2%. The coating thus obtained in the first step amounted to 27 mg/m² (as metallic chromium) and that in the second step to 15 mg/m² (as Si). This product proved excellent in the evaluation test as will be mentioned later.

EXAMPLE 4

The same material as in Example 3 was immersed for 3 sec. in a 60° C solution containing 200 g/l $CrO_3$, 160 g/l $SiO_2$ and 20 g/l $Ni(NO_3)_2$, and after being roll-squeezed the sheet was box-annealed in an open coil shape for 3 hrs. in HNX at 650° C. The product was subjected to adjustment rolling with the draft of 15%, to which then a 1.5% aqueous solution of KBM 503 (trade name) from Shinetsu Chemical Industry was applied and dried by blowing 100° C hot air for 15 sec. The film formed in the first step amounted to 24 mg/m², (as metallic chromium) and that in the second step to 19 mg/m². An evaluation test revealled it as excellent, as will be mentioned later.

EXAMPLE 5

A low carbon steel sheet (0.21 mm thick), which was produced by cold rolling and was electrolytically degreased and pickled with acid, was cathodically electrolyzed for 5 sec. with a current density 50 A/dm² in a 40° C bath containing 100 g/l $CrO_3$ and 1 g/l $K_3AlF_6$ according to the process of Patent Publication No. Sho 44-10647. The sheet thus treated was then washed with water, immersed for 2 sec. in a 1% aqueous solution of KBM 603 (trade name) from Shinetsu Chemical Industry at 30° C, roll-squeezed and dried by blowing with 100° C hot air for 10 sec. The evaluation test proved the product to have excellent quality as will be mentioned later.

EXAMPLE 6

The same material as that used in Example 5 was treated by the cathodic electrolysis for 1 sec. with current density 20 A/dm$^2$ at 45° C in a solution which contained 15 g/l CrO$_3$, 2 g/l Cr$^{+3}$, 7 g/l H$_3$PO$_4$ and 10 g/l H$_3$BO$_3$ in accordance with the process of Japanese Patent Publication No. Sho 35-8916. The material was washed with water, immersed for 2 sec. in 2% aqueous solution of KBM 503 (trade name) from Shinetsu Chemical Industry at 30° C, roll-squeezed and then dried by blowing for 5 sec. with 100° C hot air. The product thus prepared proved excellent by the evaluation test.

EXAMPLE 7

The same material as that used in Example 1 was subjected to phosphate treatment (using Bt 144 supplied by Nippon Parkerising Co.) to form a film of 2.2 g/m$^2$, immersed for 2 sec. in a 1% aqueous solution of KBM 403 (trade name) from Shinetsu Chemical Industry at 30° C, and after being roll-squeezed it was dried by blowing 100° C hot air for 15 sec. The coating obtained in the second step of process amounted to 3.5 mg/m$^2$ (as Si). The product revealled to be excellent by the evaluation test as will be mentioned later.

EXAMPLE 8

A molten zinc-plated steel sheet (the amount of zinc was 90 g/m$^2$ on one side) was immersed for 3 sec. in a treatment solution containing 40 g/l CrO$_3$ and 30 g/l SiO$_2$ at 60° C of which the excess was removed with an air-knife, and dried by blowing 100° C hot air for 3 sec, a 2% aqueous solution of KBM 403 (trade name) from Shinetsu Chemical Industry was sprayed to it, and after being roll-squeezed it was dried by blowing 100° C hot air for 5 sec. An evaluation test revealled excellent quality of it, as will be mentioned later.

EXAMPLE 9

The same material as that used in Example 8 was subjected to the phosphate treatment (with Bt No. 37S from Nippon Parkerising) to form a coating of 2.0 g/m$^2$, to which a 1% aqueous solution (20° C) of KBM 503 (trade name) from Shinetsu Chemical Industry was sprayed to it, and after being roll-squeezed it was dried by blowing 100° C hot air for 5 sec. The coating produced in the second step of process amounted to 33 mg/m$^2$ (as Si). An evaluation test revealled excellent results as will be described in a later section.

EXAMPLE 10

An electrotically tin-plated steel sheet which had been produced by the commercially practised ferrostan bath method was cathodically treated in a solution of pH 4.5 containing 25 g/l Na$_2$Cr$_2$O$_7$.2H$_2$O at 45° C with electricity of 5.0 coulombs per dm$^2$. Then a 1% solution (20° C) of KBM 503 (trade name) from Shinetsu Chemical Industry was sprayed to it and was roll-squeezed. The sheet was finally dried by blowing 100° C hot air for 5 sec. The coating produced in the second step of process amounted to 20 mg/m$^2$ (as Si). An evaluation test revealled excellent quality, as will be described later.

EXAMPLE 11

A chromium-plated steel sheet having a metallic chromium coating of 100 mg/m$^2$ was electrolytically treated in a 45° C solution containing 80 g/l CrO$_3$ with a current density of 10 A/dm$^2$ for 1 sec. using the sheet as cathode. A 1% solution of KBM 603 (trade name) from Shinetsu Chemical Industry was sprayed to the sheet and the sheet was dried by blowing 100° C hot air for 5 sec. The coating formed in the second step amounted to 15 mg/m$^2$ (as Si). An evaluation test proved the product to be excellent, as will be shown later.

EXAMPLE 12

A molten aluminum-plated steel sheet (the aluminum layer being 25$\mu$ thick) was treated, according to the process of Japanese Patent Publication No. Sho 38-10955, in a solution consisting of 4.5 g chromic acid, 6.0 g sodium fluoroborate, 1.65 g potassium fluorozirconate, 2.85 g potassium ferricyanide and 1 liter water. Then a 1% aqueous solution of KBM 403 (trade name) from Shinetsu Chemical Industry was sprayed to the sheet, and this was dried by blowing 100° C hot air for 5 sec. The coating formed in the second step amounted to 17 mg/m$^2$ (as Si). This treatment produced excellent results as will be shown later.

COMPARISON EXAMPLE 1

A low carbon steel sheet (0.3 mm thick) which was cold rolled and degreased electrolytically.

COMPARISON EXAMPLE 2

A low carbon steel sheet (0.3 mm thick) which was immersed for 3 sec. in a 50° C solution containing 330 g/l CrO$_3$, 280 g/l SiO$_2$ and 10 g/l Ni(NO$_3$)$_2$, roll-squeezed, and then box-annealed in a tight coil shape for 3 hrs. at 650° C.

COMPARISON EXAMPLE 3

The same material as used in Comparison Example 1 was given spray of a 1% aqueous solution of KBM 503 (trade name) from Shinetsu Chemical Industry at 30° C and dried by blowing 100° C hot air for 10 sec.

COMPARISON EXAMPLE 4

The same material as used in Comparison Example 1 was subjected to the phosphate treatment (with Bt No. 144 from Nippon Parkerising Co.) to form a coating of 2.2 g/m$^2$.

COMPARISON EXAMPLE 5

A molten zinc-plated steel sheet (the amount of zinc being 90 g/m$^2$ on one side), which was immersed for 3 sec. in a 60° C solution containing 40 g/l CrO$_3$ and 30 g/l SiO$_2$, of which the excess was removed with an air knife, and was dried by blowing 100° C hot air for 3 sec.

COMPARISON EXAMPLE 6

The same material as used in Comparison Example 5 was subjected to the phosphate treatment (with Bt No. 37S from Nippon Parkerising Co.) to form a coating of 2.0 g/m$^2$.

COMPARISON EXAMPLE 7

An electrolytically tin-plated steel sheet prepared by use of the widely practised ferrostan bath was treated at 45° C in a solution of pH 4.5 containing 25 g/l Na$_2$C-

$r_2O_7 \cdot 2H_2O$ using a current density of 5.0 coulombs per $dm^2$ with the said sheet as cathode.

COMPARISON EXAMPLE 8

A chromium-plated steel sheet having 100 mg/m² of metallic chromium was electrolytically treated in a 45° C solution containing 80 g/l $CrO_3$ using a current density of 10 A/dm² for 1 sec. with the said sheet as cathode.

COMPARISON EXAMPLE 9

A molten aluminum-plated steel sheet (the aluminum layer being 25μ thick) was treated according to the process of Japanese Patent Publication No. Sho 38-10955, in a solution consisting of 4.5 g chromic acid, 6.0 g sodium fluoroborate, 1.65 g potassium fluorozirconate, 2.85 g potassium ferricyanide and 1 liter water.

Results of the evaluation tests carried out with the present invention and the comparison examples referred to above are shown below.

| Example | First adhesion | Second adhesion | Corrosion resistance of painted layer | Under-cutting corrosion test |
|---|---|---|---|---|
| Example 1 | O | O | O | O |
| 2 | O | O | O | O |
| 3 | O | O | O | O |
| 4 | O | O | O | O |
| 5 | O | O | O | O |
| 6 | O | O | O | O |
| 7 | O | O | O | x |
| 8 | O | O | O | — |
| 9 | O | O | O | — |
| 10 | O | O | O | O |
| 11 | O | O | O | O |
| 12 | O | O | O | — |
| Comparison Example 1 | O | xx | xx | xx |
| 2 | O | x | x | xx |
| 3 | O | o | x | xx |
| 4 | O | o | o | x |
| 5 | o | o | △ | — |
| 6 | O | O | o | — |
| 7 | o | o | O | O |
| 8 | △ | x | x | O |
| 9 | o | o | o | — |

Remark 1: Except for the under-cutting corrosion test, a melamine alkyd paint (Orga 100-II Light Vermilion from Nippon Paint Co.) was applied in an amount of 250 mg/dm² and baked for 20 min. at 120° C.

Remark 2: For the under-cutting corrosion test, an epoxyphenol paint (83-088 supplied from Dainippon Ink Chemical Industry) was applied in an amount of 55 mg/dm² and baked at 210° C for 10 min.

Remark 3: The first adhesion was tested by an extrusion working (5 mm Erichsen extrusion), cutting with knife in an asterisk, followed by peeling off of the cellophane tape.

Remark 4: The second adhesion was tested, after the same extrusion working as above, by immersing for 24 hrs. in 40° C pure water, immediately cutting with a knife in an asterisk, followed by peeling with cellophane tape.

Remark 5: The corrosion resistance of the paint layer was tested, after the working as above, by applying a knife cut in an asterisk, followed by a salt spraying test (JIS Z2371) for 48 hrs. and peeling off of the cellophane tape.

Remark 6: The under-cutting corrosion test was carried out by applying a knife cut in an x, immersing for 4 days in a 25° C aqueous solution containing 1.5% citric acid and 1.5% sodium chloride, followed by peeling with cellophane tape.

Remark 7: Marks stand for the following meanings:
O : No change was observed.
o : Slight peeling of the painted layer.
△ : Apparent peeling of the painted layer.
x : Considerable peeling off of the painted layer.
xx : Almost completely peeled off.

It is clearly understood that a steel sheet treated by the process of the present invention exhibits better paintability than that of the same steel sheet to which the same treatment is not applied at all or only partly, and the paintability of the former is comparable with that of expensive plated steel sheets prepared by different methods.

As has been described in detail, the base steel sheets for painting of this invention exhibit excellent achievements with respect to the most important characteristics, that is corrosion resistance when painted and the under-cutting corrosion resistance. In addition, the treatment is simple enough. Therefore, a base steel sheet for painting of excellent quality can be provided with less expense by the present invention.

What is claimed is:

1. A surface treated steel sheet and strip having a surface layer of M-Si-R in which M is at least one element selected from the group consisting of chromium, phosphorus, silicon, cobalt, manganese, copper, nickel, aluminum and titanium, and R is a group of atoms which has 2 to 10 carbon atoms and contains one or more functional groups selected from the group consisting of vinyl, epoxy, acryl and amino groups.

2. A surface treated steel sheet and strip having good paintability, comprising a base steel sheet, a corrosion resistant film formed on the base steel sheet by treating the base metal sheet in a solution containing at least one compound selected from the group consisting of chromic acid, phosphoric acid, and salts of chromium, molybdenum, silicon, cobalt, manganese, copper, nickel, aluminum or titanium and a coating formed on the film by treatment in a solution containing at least one organic silicon compound having a general formula of $RSiX_3$ in which R is a group of atoms which has 2 to 10 carbon atoms and contains one or more functional groups selected from the group consisting of vinyl, epoxy, acryl and amino groups and X stands for a halogen or an alkoxyl group.

3. A surface treated steel sheet according to claim 2, in which the amount of the organic silicon compound applied is in an amount from 5 to 50 mg/m² as Si.

4. A process for surface treatment of a steel sheet comprising treating a base steel sheet in a solution containing at least one compound selected from the group consisting of chromic acid, phosphoric acid, salts of chromium, molybdenum, silicon, cobalt, manganese, copper, nickel, aluminum and titanium, and then treating the steel sheet thus treated in a solution containing at least one organic silicon compound having a general formula of $RSiX_3$, in which R is a group of atoms which has 2 to 10 carbon atoms and contains one or more functional groups selected from the group consisting of vinyl, epoxy, acryl and amino groups and X stands for a halogen or an alkoxyl group.

5. A process according to claim 4, in which the organic silicon compound is applied on the steel sheet in an amount from 5 to 50 mg/m² as Si.

6. A process according to claim 4, in which the first treatment is an electrolytic treatment in the solution.

7. A process according to claim 4, in which the first treatment is an immersion treatment in the solution.

* * * * *